(12) United States Patent
Luo et al.

(10) Patent No.: US 8,854,782 B2
(45) Date of Patent: Oct. 7, 2014

(54) OVERCURRENT PROTECTION DEVICE

(75) Inventors: Qi-Yan Luo, Shenzhen (CN); Song-Lin Tong, Shenzhen (CN); Peng Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 761 days.

(21) Appl. No.: 13/086,405

(22) Filed: Apr. 14, 2011

(65) Prior Publication Data

US 2012/0182661 A1    Jul. 19, 2012

(30) Foreign Application Priority Data

Jan. 19, 2011    (CN) .......................... 2011 1 0021432

(51) Int. Cl.
*H02H 9/02*    (2006.01)
*H02H 3/087*    (2006.01)
*G06F 1/28*    (2006.01)

(52) U.S. Cl.
CPC . *H02H 3/087* (2013.01); *G06F 1/28* (2013.01)
USPC ........................................................ 361/93.7

(58) Field of Classification Search
USPC ........................................................ 361/93.7
See application file for complete search history.

(56) References Cited

U.S. PATENT DOCUMENTS

| | | | |
|---|---|---|---|
| 6,973,594 B2 * | 12/2005 | Bennett ............................ | 714/43 |
| 7,991,588 B1 * | 8/2011 | Krieger .......................... | 702/186 |
| 8,271,819 B2 * | 9/2012 | Breen et al. .................... | 713/330 |
| 8,656,201 B2 * | 2/2014 | Campesi et al. ............... | 713/340 |
| 2002/0158656 A1 * | 10/2002 | Neeb .............................. | 324/771 |
| 2005/0174137 A1 * | 8/2005 | DeVey ........................... | 324/765 |
| 2006/0101296 A1 * | 5/2006 | Mares et al. ................... | 713/300 |
| 2010/0073837 A1 * | 3/2010 | Predtetchenski et al. ..... | 361/91.5 |
| 2012/0151242 A1 * | 6/2012 | McGrath et al. ............... | 713/340 |
| 2012/0182661 A1 * | 7/2012 | Luo et al. ...................... | 361/93.7 |
| 2013/0067534 A1 * | 3/2013 | Soffer .............................. | 726/2 |
| 2013/0232362 A1 * | 9/2013 | Zhou .............................. | 713/323 |
| 2013/0271206 A1 * | 10/2013 | Sakai ............................ | 327/518 |

FOREIGN PATENT DOCUMENTS

| | | |
|---|---|---|
| CN | 2580444 Y | 10/2003 |
| CN | 1788398 A | 6/2006 |
| CN | 101256437 A | 9/2008 |
| CN | 201349072 A | 11/2009 |
| CN | 101820162 A | 9/2010 |
| TW | 391535 U | 5/2000 |

(Continued)

*Primary Examiner* — Ronald W Leja
(74) *Attorney, Agent, or Firm* — Novak Druce Connolly Bove + Quigg LLP

(57) ABSTRACT

An overcurrent protection device includes a power input terminal, a power output terminal, a first signal terminal, a second signal terminal, a testing circuit, and a switch element. The power input terminal and the first signal terminal are connected to a power supply. The power output terminal and the second signal terminal are connected to a computer motherboard. If the first and second terminals are disconnected from each other when the computer motherboard works, the power supply stops working. The testing circuit includes a fixed resistor and a control chip parallel connected between the power input and output terminal. The control chip stores a predetermined voltage threshold, and detects voltage between the two terminals of the fixed resistor, and compares the measured voltage with the predetermined voltage threshold. The switch element disconnects the first and second signal terminals when the measured voltage is greater than the predetermined voltage threshold.

10 Claims, 5 Drawing Sheets

(56) References Cited

FOREIGN PATENT DOCUMENTS

| TW | 200703855 | A | 1/2007 |
| TW | 201035817 | A1 | 10/2010 |
| TW | 201042415 | A1 | 12/2010 |

* cited by examiner

OVERCURRENT PROTECTION DEVICE

BACKGROUND

1. Technical Field

The present disclosure relates to overcurrent protection devices, and particularly, to an overcurrent protection device for a power supply unit (PSU).

2. Description of Related Art

If a user wants to assemble a computer by himself, he may employ a PSU to provide enough current to a central processing unit (CPU) of the computer. The PSU usually has an overcurrent protection function and stores a current threshold. When the PSU outputs a current greater than the current threshold, the PSU will stop working to protect the electronic elements of the computer. However, the current threshold of the PSU is usually higher than the largest current the other electronic elements of the computer can bear. When the PSU starts the overcurrent protection function, the electronic elements of the computer may have been damaged because of the large current.

Therefore, it is desirable to provide an overcurrent protection device, which can overcome the above-mentioned limitations.

BRIEF DESCRIPTION OF THE DRAWINGS

Many aspects of the disclosures should be better understood with reference to the following drawings. The components in the drawings are not necessarily drawn to scale, the emphasis instead being placed upon clearly illustrating the principles of the present disclosure.

DETAILED DESCRIPTION

Figure 1:
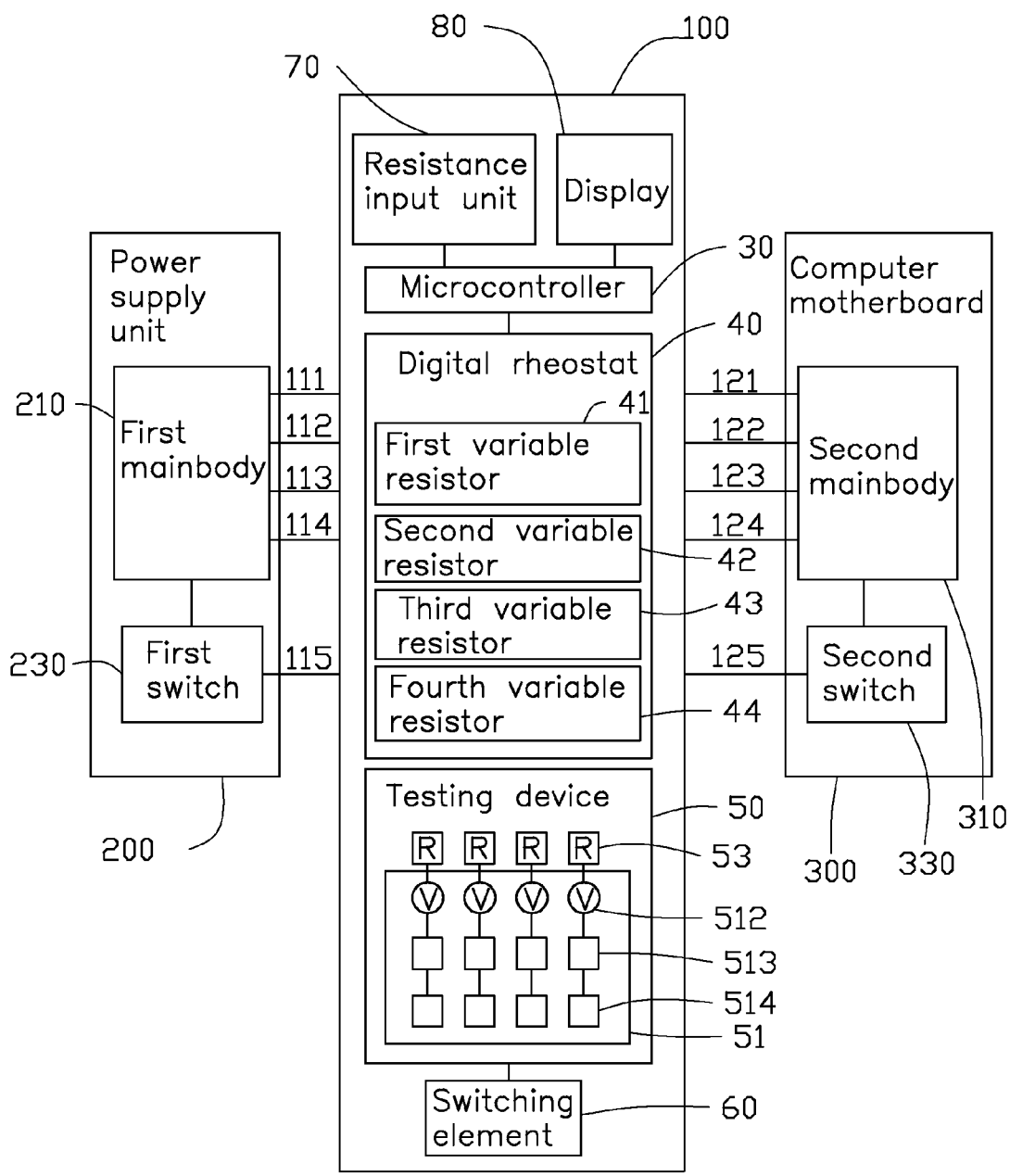
FIG. 1 is a functional block diagram of an overcurrent protection device, according to an exemplary embodiment.

FIG. 1 is a functional block diagram of an overcurrent protection device 100, according to an exemplary embodiment. The overcurrent protection device 100 is configured for electrically connecting a PSU 200 to a computer motherboard 300, to prevent the electronic elements of the computer motherboard 300 from being damaged during overcurrent passing through the computer motherboard 300. The PSU 200 includes a first main body 210 and a first switch 230. The computer motherboard 300 includes a second main body 310 and a second switch 330. The first switch 230 controls the PSU 200 to work normally. The second switch 330 inputs an instruction by a user.

The overcurrent protection device 100 includes a plurality of power input terminals, a plurality of power output terminals, a first signal terminal 115, a second signal terminal 125, a microcontroller 30, a digital rheostat 40, a testing circuit 50, a switch element 60, a resistance input unit 70, and a display 80.

The power input terminals are electrically connected to the first main body 210, and include a first power input terminal 111, a second power input terminal 112, a third power input terminal 113, and a fourth power input terminal 114. The power output terminals are electrically connected to the second main body 310, and include a first power output terminal 121, a second power output terminal 122, a third power output terminal 123, and a fourth power output terminal 124. That is, the first main body 210 of the PSU 200 provides four voltages to four corresponding electronic elements of the second main body 310 of the computer motherboard 300. In one embodiment, the output voltages of the four power input terminals 111, 112, 113, 114 can be about 12V, 12V, 5V, 3.3V, respectively. In other embodiments, the number of power input terminals and power output terminals could be other than four according to practical need.

The first signal terminal 115 is electrically connected to the first switch 230. The second signal terminal 125 is electrically connected to the second switch 330. When the user inputs a power-on instruction through the second switch 330, the first signal terminal 115 and the second signal terminal 125 are electrically connected to each other, the PSU 200 provides power to the computer motherboard 300. When the computer motherboard 300 works, if the first signal terminal 115 and the second signal terminal 125 are disconnected, the PSU 200 stops working. The switch element 60 controls the first signal terminal 115 and the second signal terminal 125 to electrically connect or disconnect to each other.

The microcontroller 30 sends control signals to the digital rheostat 40, the resistance input unit 70, and the display 80. Also referring to FIG. 2, the microcontroller 30 includes an RB2 terminal, an RB3 terminal, an RB4 terminal, an RB5 terminal, an RB6 terminal, and an RB7 terminal. The RB2-RB7 terminals are output/input terminals.

Figure 2:
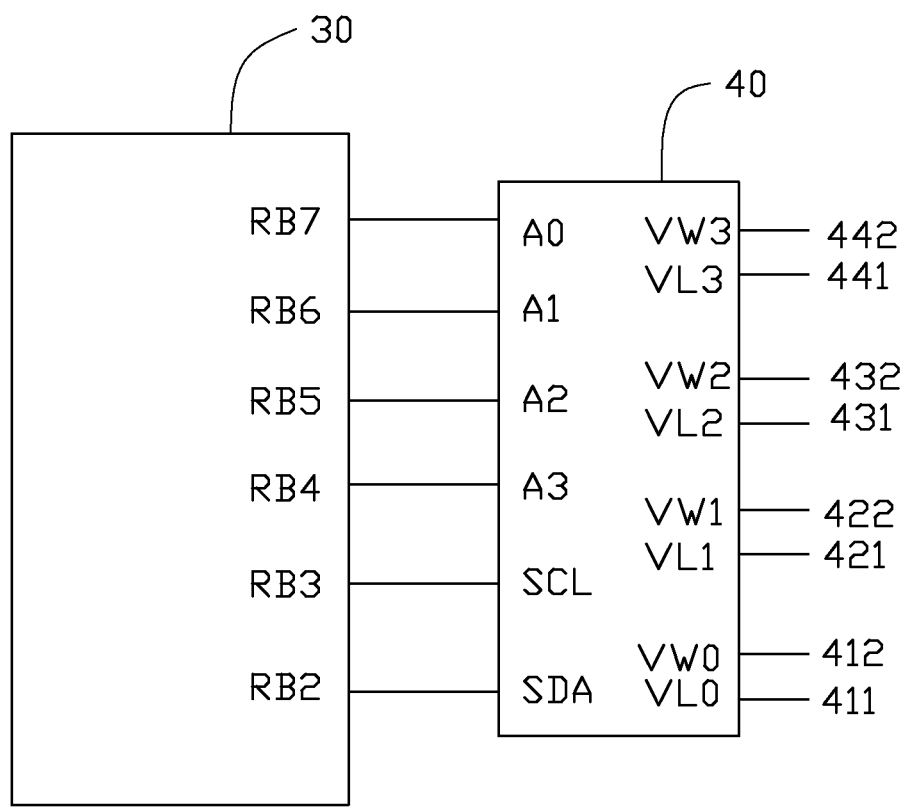
FIG. 2 is one embodiment of a schematic view of a microcontroller and a digital rheostat of the overcurrent protection device of FIG. 1, showing the connection of the microcontroller and the digital rheostat.

Referring to FIG. 1 and FIG. 2, the digital rheostat 40 includes a first variable resistor 41, a second variable resistor 42, a third variable resistor 43, and a fourth variable resistor 44. The first variable resistor 41 includes a first sliding terminal 411 and a first fixed terminal 412. The second variable resistor 42 includes a second sliding terminal 421 and a second fixed terminal 422. The third variable resistor 43 includes a third sliding terminal 431 and a third fixed terminal 432. The fourth variable resistor 44 includes a fourth sliding terminal 441 and a fourth fixed terminal 442. The digital rheostat 40 controls the number of the resistors electrically connected between the sliding terminal and the corresponding fixed terminal of each variable resistor, thereby adjusting the resistance of the four variable resistors 41, 42, 43, 44. The digital rheostat 40 has an A0 terminal, an A1 terminal, an A2 terminal, an A3 terminal, an SCL terminal, an SDA terminal, an VL0 terminal, an VW0 terminal, an VL1 terminal, an VW1 terminal, an VL2 terminal, an VW2 terminal, an VL3 terminal, and an VW3 terminal. The A3-A0 terminals are address terminals, and are electrically connected to the RB2-RB7 terminals of the microcontroller 30. The SCL terminal is a serial clock terminal. The SDA terminal is a serial data terminal. The VL0-VL3 terminals and the VW0-VW3 terminals are input/output terminals. In this embodiment, the VL0 terminal is the first sliding terminal 411, the VW0 terminal is the first fixed terminal 412, the VL1 terminal is the second sliding terminal 421, the VW1 terminal is the second fixed terminal 422, the VL2 terminal is the third sliding terminal 431, the VW2 terminal is the third fixed terminal 432, the VL3 terminal is the fourth sliding terminal 441, the VW2 terminal is the fourth fixed terminal 442. In one embodiment, the maximum resistance values of the four variable resistors 41, 42, 43, 44 can be all about 10K ohms.

Figure 3:
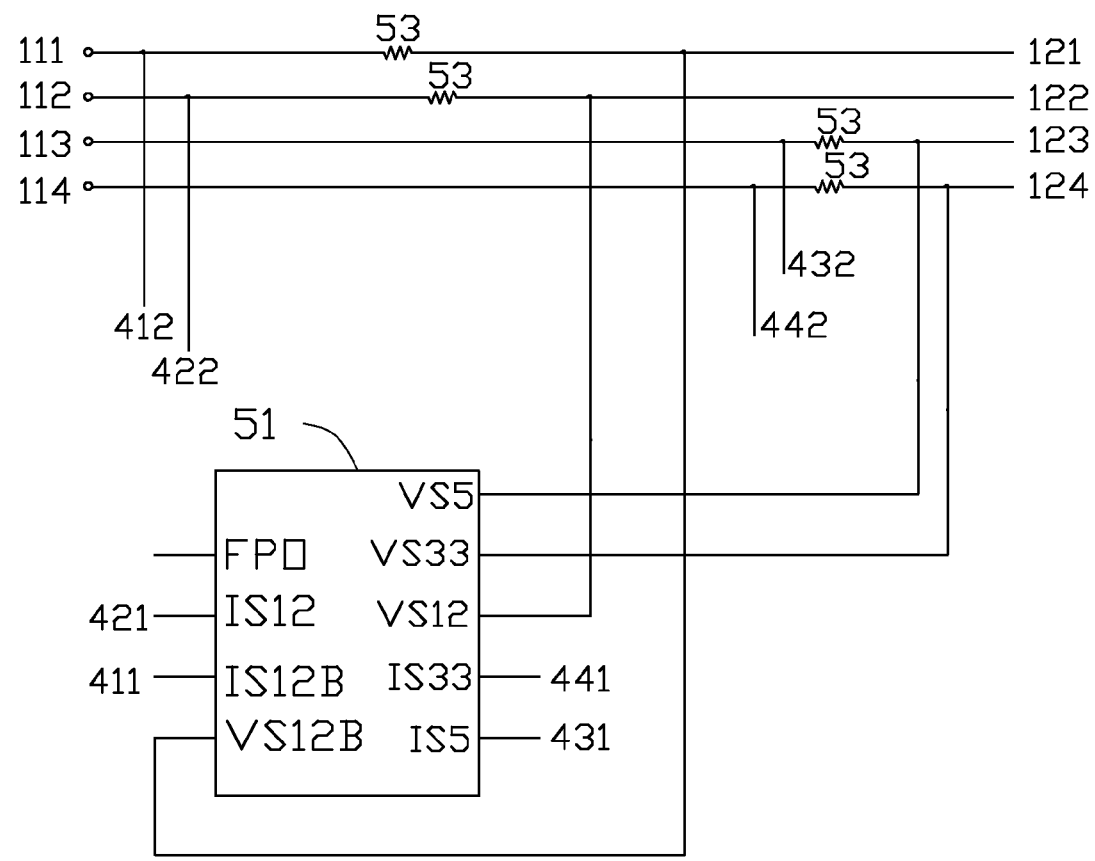
FIG. 3 is one embodiment of a schematic view of a detecting device of the overcurrent protection device of FIG. 1.

Referring to FIG. 1 and FIG. 3, the testing circuit 50 includes a control chip 51 and four fixed resistors 53 having a same resistance. The control chip 51 includes four voltmeters 512, four voltage threshold setting modules 513, and four comparison modules 514. The four voltmeters 512 are respectively and electrically connected to the four fixed resistors 53, and respectively measure the voltages of the four fixed resistors 53. The four voltage threshold setting modules 513 set the voltage thresholds according to the requirement of the user. The comparison modules 514 compares the voltage of each fixed resistor 53 and the corresponding set voltage threshold.

Two terminals of the four fixed resistors 53 are respectively and electrically connected between the first power input terminal 111 and the first output terminal 121, the second power input terminal 112 and the second output terminal 122, the third power input terminal 113 and the third output terminal 123, the fourth power input terminal 114 and the fourth output terminal 124. The resistances of the four fixed resistors 53 are less than the maximum resistances of the four variable resistors, and thus, a maximum amount of the current passes through the corresponding fixed resistors 53 to arrive as the working current of the computer motherboard 300. Therefore, the voltage of the four fixed resistors 53 can reflect the current of the computer motherboard 300. In one embodiment, the resistance of each fixed resistor 53 is about 5 ohms.

The control chip 51 has an FPO terminal, an IS12B terminal, a VS12B terminal, an IS12 terminal, a VS12 terminal, an IS5 terminal, a VS5 terminal, an IS33 terminal, and a VS33 terminal. The FPO terminal is signal output terminal and outputs the comparison result. The IS12B, VS12B, IS12, VS12, IS5, VS5, IS33, VS33 are input/output terminals.

In this embodiment, if the voltage of one fixed resistor 53 is greater than the set voltage threshold, the FPO terminal will output lower level "0" to the switch element 60. The IS12B terminal is electrically connected to the first sliding terminal 411. The VS12B terminal is electrically connected between the first power output terminal 121 and the corresponding fixing resistance 53. The IS12 terminal is electrically connected to the second sliding terminal 421. The VS12 terminal is electrically connected between the second power output terminal 122 and the corresponding fixed resistor 53. The IS5 terminal is electrically connected to the third sliding terminal 431. The VS5 terminal is electrically connected between the third power output terminal 123 and the corresponding fixing resistance 53. The IS33 terminal is electrically connected to the fourth sliding terminal 441. The VS33 terminal is electrically connected between the fourth power output terminal 124 and the corresponding fixing resistance 53.

Figure 4:
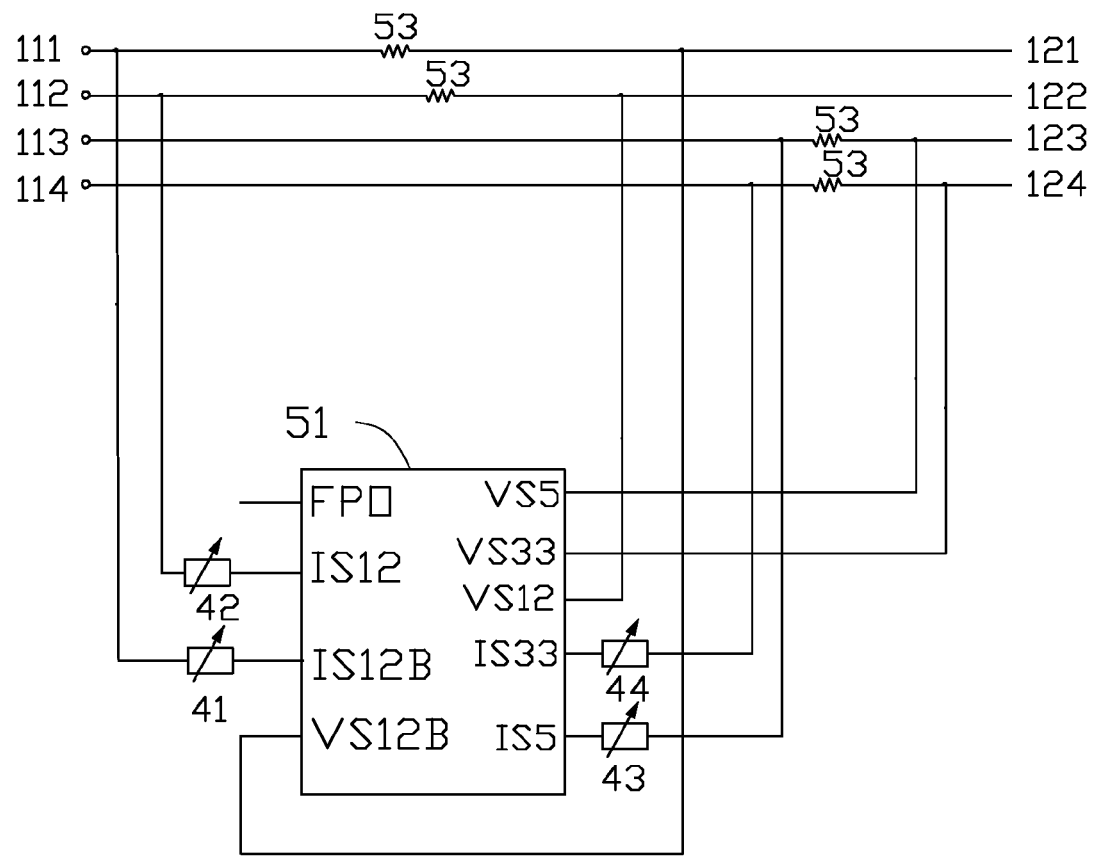
FIG. 4 is one embodiment of an equivalent circuit diagram of the overcurrent protection device of FIG. 1.
Figure 5:
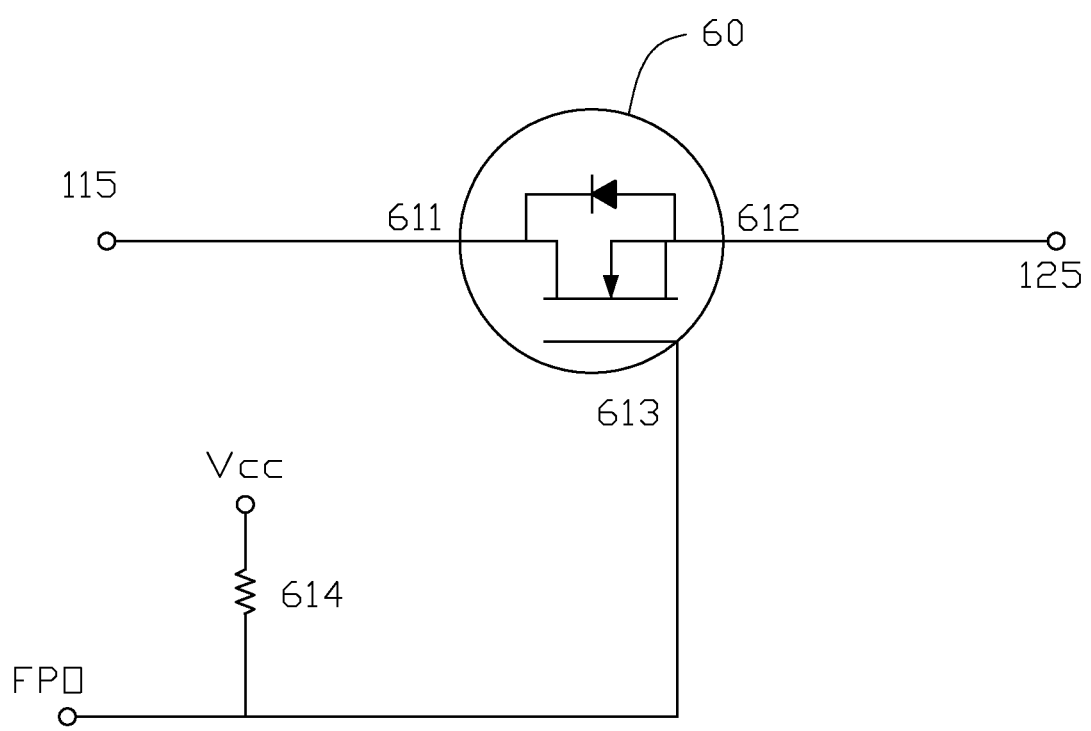
FIG. 5 is one embodiment of a schematic view of a switch element of the overcurrent protection device of FIG. 1.

Referring to FIG. 4, one terminal of the first variable resistor 41 is electrically connected to the first power input terminal 111, the other terminal of the first variable resistor 41 is electrically connected to the first power output terminal 121 through the control chip 51. One terminal of the second variable resistor 42 is electrically connected to the second power input terminal 112, the other terminal of the second variable resistor 42 is electrically connected to the third power output terminal 123 through the control chip 51. One terminal of the third variable resistor 43 is electrically connected to the third power input terminal 113, the other terminal of the third variable resistor 43 is electrically connected to the third power output terminal 123 through the control chip 51. One terminal of the fourth variable resistor 44 is electrically connected to the fourth power input terminal 114, the other terminal of the fourth variable resistor 44 is electrically connected to the fourth power output terminal 124 through the control chip 51. In this embodiment, the control chip 51 can be an SG6520 integrated circuit. The predetermined voltage threshold in each voltage threshold setting module 513 is proportional to the resistance of the corresponding variable resistor, and satisfy the following equation: $U_i=K*R_i$, wherein $U_i$ represents the predetermined voltage threshold, $K=4.167*10^{-5}$, and $R_i$ represents the resistance of the variable resistor. Accordingly, when the resistance of the variable resistor increases, the predetermined voltage threshold increases. Therefore, the user can set the voltage threshold through adjusting the resistance of the variable resistors.

The switch element 60 includes a first terminal 61, a second terminal 62, and a controlling terminal 63 configured for controlling the connection or disconnection between the first terminal 61 and the second terminal 62. The first terminal 61 is electrically connected to the first signal terminal 115. The second terminal 62 is electrically connected to the second signal terminal 125. The controlling terminal 63 is electrically connected to the FPO terminal of the control chip 51. In this embodiment, the switch element 60 is N-channel MOS field effect transistor (N-channel MOSFET), the first terminal 61 is drain electrode, the second terminal 62 is source electrode, the controlling terminal 63 is gate electrode. The N-channel MOSFET has a character: when the gate electrode is high level "1", the drain electrode and the source electrode are electrically connected to each other; when the gate electrode is low level "0", the drain electrode and the source electrode are disconnected to each other. In this embodiment, the FPO terminal and the controlling terminal 63 are electrically connected to a direct power source VCC through a resistor. The resistance of the resistor can be 10K ohm. In other embodiment, the resistor and the direct power source VCC also can be omitted.

The resistance input unit 70 is electrically connected to the microcontroller 30, and adjusts the resistance of the first, second, third, and fourth variable resistors 41, 42, 43, 44. In this embodiment, the resistance input unit 70 can be a matrix keyboard circuit.

The display 80 is electrically connected to the microcontroller 30, and displays the current value passing through the four fixed resistances. In this embodiment, the display 80 is a crystal display.

In use, the user sets the resistances of the four resistors 41, 42, 43, 44 in the digital rheostat 40, thereby getting four voltage thresholds. When the second switch 330 of the computer motherboard 300 is pressed, the first signal terminal 115 is electrically connected to the second signal terminal 125, and the PSU 200 works normally. The four voltmeters 512 respectively detect the voltage drops across the four fixing resistances 53. The four comparison modules 514 respectively compare the voltage drop with the corresponding preset voltage thresholds. If one voltage drop is greater than the corresponding preset voltage threshold, the controlling terminal 613 becomes low level "0", and the first signal terminal 115 is disconnected to the second signal terminal 125, the PSU 200 stops working, thus preventing the electronic elements of the computer motherboard 300 from being damaged.

It will be understood that the above particular disclosures are shown and described by way of illustration only. The principles and the features of the present disclosure may be employed in various and numerous disclosures thereof without departing from the scope of the disclosure as claimed. The above-described disclosures illustrate the scope of the disclosure but do not restrict the scope of the disclosure.

What is claimed is:

1. An overcurrent protection device, comprising:
at least one power input terminal electrically connected to a power supply, at least one power output terminal electrically connected to a computer motherboard, a first signal terminal electrically connected to the power supply, a second signal terminal electrically connected to the computer motherboard, wherein when a user inputs a power-on instruction using the second signal terminal, the first signal terminal and the second signal terminal are electrically connected to each other, causing the power supply to start to work, and if the first terminal and the second terminals are disconnected from each other when the computer motherboard works, the power supply stops working;

a testing circuit comprising a fixed resistor and a control chip which are parallel electrically connected between the power input terminal and the power output terminal, the control chip storing a predetermined voltage threshold, and configured for detecting voltage between the two terminals of the fixed resistor, and comparing the measured voltage with the predetermined voltage threshold; and a switch element configured for disconnecting the first signal terminal and the second signal terminal when the measured voltage is greater than the predetermined voltage threshold.

2. The overcurrent protection device in claim 1, wherein the control chip comprises a voltmeter, a voltage setting module, and a comparison module, the voltmeter is configured for measuring the voltage drops across the corresponding fixed resistor, the voltage setting module is configured for presetting the voltage threshold, the comparison module is configured for comparing the voltage drop and the preset voltage threshold, to output a comparison result to the switch element.

3. The overcurrent protection device in claim 1, further comprising a variable resistor, wherein one terminal of the variable resistor is electrically connected to the power input terminal, the other terminal of the variable resistor is electrically connected to the power output terminal through the control chip, the resistance of the fixed resistor is less than resistance of the variable resistor, the voltage threshold is capable of being set through adjusting the resistance of the variable resistor.

4. The overcurrent protection device in claim 3, wherein the resistance of the variable resistor is proportional to the preset voltage threshold.

5. The overcurrent protection device in claim 3, wherein the variable resistor is positioned in a digital rheostat, the overcurrent protecting device further comprising a microcontroller and a resistance input unit, the microcontroller is electrically connected to the digital rheostat and the resistance input unit, the resistance input unit is configured for adjusting the resistance of the variable resistor.

6. The overcurrent protection device in claim 5, wherein the resistance input unit is a matrix keyboard circuit.

7. The overcurrent protection device in claim 1, wherein the switch element comprises a first terminal, a second terminal, and a controlling terminal configured for controlling the connection or disconnection of the first terminal and the second terminal, the first terminal is the first signal terminal, the second terminal is the second signal terminal, the controlling terminal is electrically connected to the control chip.

8. The overcurrent protection device in claim 7, wherein the switch element is N-channel MOS field effect transistor, the first terminal is drain electrode, the second terminal is source electrode, the controlling terminal is gate electrode.

9. The overcurrent protection device in claim 1, wherein the power supply module comprises a first main body and a first switch, the computer motherboard comprises a second main body and a second switch, the power input terminal is electrically connected to the first main body, the first switch is electrically connected to the first signal terminal, the power output terminal is electrically connected to the second main body, the second switch is electrically connected to the second signal terminal.

10. The overcurrent protection device in claim 1, further comprising a display, wherein the display is electrically connected to the microcontroller and configured for displaying the current value passing through the fixing resistor.

* * * * *